UNITED STATES PATENT OFFICE.

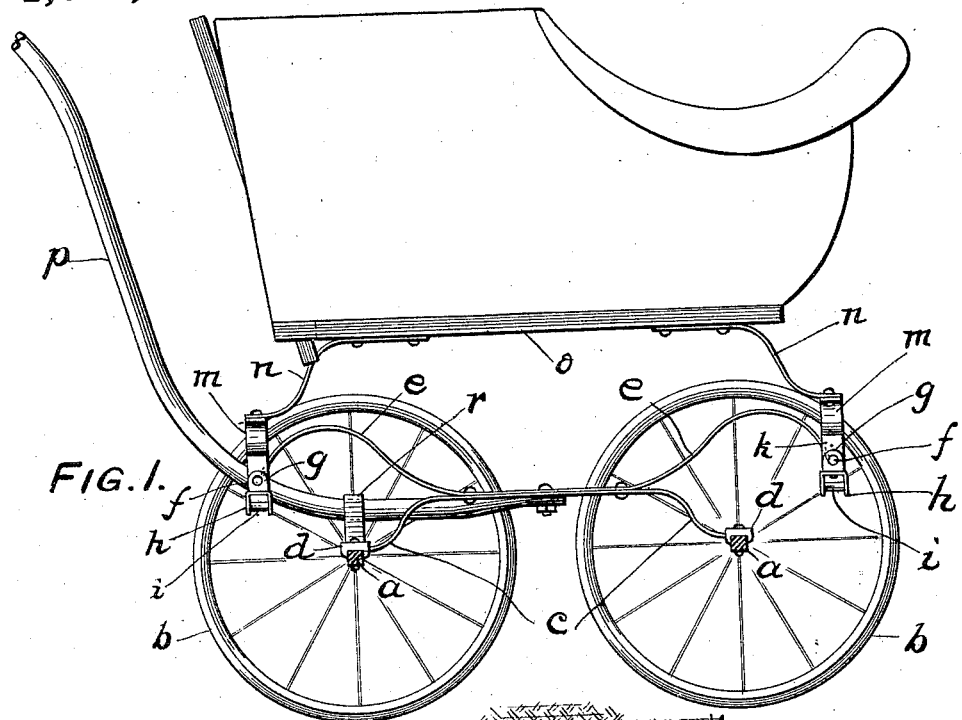
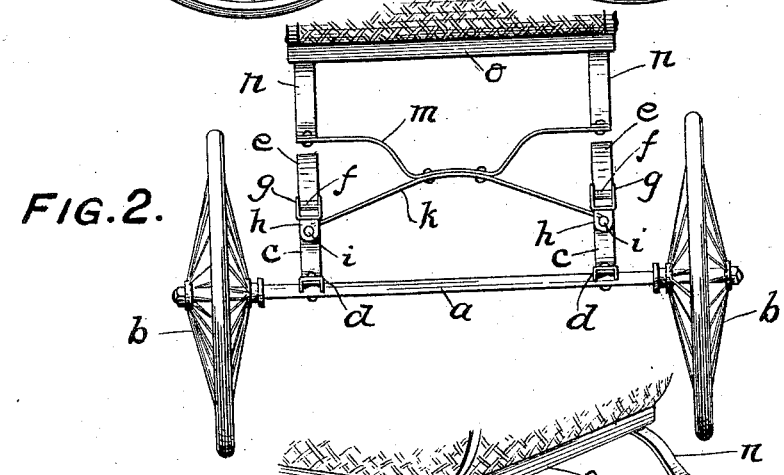
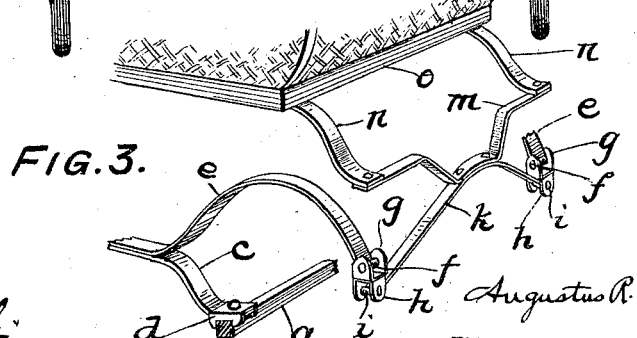

AUGUSTUS R. LAMPLUGH, OF PHILADELPHIA, PENNSYLVANIA, ASSIGNOR TO MOSES L. BLOCK, OF PHILADELPHIA, PENNSYLVANIA.

GO-CART.

1,049,372. Specification of Letters Patent. Patented Jan. 7, 1913.

Application filed November 15, 1911. Serial No. 660,375.

*To all whom it may concern:*

Be it known that I, AUGUSTUS R. LAMPLUGH, a citizen of the United States, residing at Philadelphia, county of Philadelphia, and State of Pennsylvania, have invented a new and useful Improvement in Go-Carts, of which the following is a full, clear, and exact description, reference being had to the accompanying drawings, which form a part of this specification.

The object of the invention is to provide, between the axles and the vehicle body, an arrangement of spring-supports, combining the maximum of strength and elasticity, by means of which the body may be freely rocked both in a longitudinal and transverse direction as well as up and down.

The invention consists of sets of side springs and end springs, superposed one upon another, and supported from the axle and supporting the body, whereby the above objects are attained, as more particularly hereinafter described and pointed out in the claims.

In the drawings: Figure 1 is a side view; Fig. 2 an end view; and Fig. 3 a detail perspective view.

$a$ are the axles and $b$ the wheels. Connecting the axles, at each side of the vehicle, is a spring $c$. The central part of the spring $c$ is substantially horizontal and located above the level of the axles, while the ends connecting with the axles are of compound curve form. The extremities overlie the axle and are secured thereto by means of clips $d$ riveted to the springs and axles. Overlying each spring $c$ is a spring $e$. The central part of the spring $e$ extends in a substantially horizontal direction and is riveted to the spring $c$. Each end of the spring $e$ is curved upward and thence downward, and extends substantially beyond the corresponding axle. The extremity is bent about a pin $f$ extending between the upright flanges of a holder $g$. Secured to the bottom of the holder $g$ is a holder $h$, between the depending flanges of which is a pin $i$. At each end of the vehicle a spring $k$ connects the holders $h$ on opposite sides of the vehicle, the extremities of the springs being bent around the pins $i$ of said holders. The spring $k$ is bow-shaped with its convex side facing upward. Overlying each spring $k$ is a spring $m$. The central part of the spring $m$ is riveted to the central part of the spring $k$. The ends of the spring $m$ extend upward and thence outward toward the side of the vehicle. Secured to the ends of each spring $m$ are longitudinally-extending springs $n$. Each spring $n$ is secured at one extremity to the corresponding extremity of the spring $m$, and thence is reversely curved upwardly and thence horizontally, the horizontally-extending end being secured to the vehicle body $o$.

$p$ is the handle the side arms of which are supported on brackets $r$ on the rear axle, while their forward extremities are riveted to the central parts of the springs $c$ and $e$.

By means of the construction described, the vehicle-body may be moved freely up-and-down as well as rocked in either a horizontal or a transverse direction. The construction is such that the cushioning effect is well distributed, and the springs may be made quite strong while preserving the desired degree of elasticity.

While I have applied the term "springs" to all the constituent elements of the gear connecting the axles and vehicle body, it is obvious that all of them need not have a substantial spring action.

Having now fully described my invention, what I claim and desire to protect by Letters Patent is:—

1. In a go-cart, the combination with the axles and vehicle body, of lower longitudinally-extending side-springs connecting the axles, upper longitudinally-extending side-springs overlying and connected to the lower side-springs and extending substantially beyond the axles at opposite ends, lower transversely extending end-springs connecting the extremities of the upper side-springs, upper transversely-extending end-springs overlying and connected to the lower end springs, and longitudinally extending springs connecting the upper transversely-extending end-springs with the vehicle body.

2. In a go-cart, the combination with the axles and vehicle body, of a pair of longitudinally extending side springs extending beyond the axles, means by which said springs are supported between their ends from the axles, a pair of transverse end springs, means by which said end springs are supported between their ends from the ends of said side springs, and springs connecting the ends of said end springs with the body.

3. In a go-cart, the combination with the axles and the vehicle body, of a pair of lower longitudinally-extending side-springs each of which has a central horizontal portion above the level of the axles and curved end portions connected to the axles, a pair of upper longitudinally-extending side-springs each of which has a central horizontal portion secured to the central horizontal portion of the corresponding lower side-spring and end portions curved successively upward and downward and extending substantially beyond the axles, a pair of transversely-extending lower end springs each of which is connected at opposite ends to the corresponding ends of the pair of upper side-springs and is curved upward between its ends, a pair of transversely-extending upper end springs each of which has a central portion connected to the corresponding lower end-spring and upwardly extending end portions, and two pairs of longitudinally-extending end springs, each pair being secured to opposite ends of the corresponding upper-end spring and thence curved upward and connected to the body.

In testimony of which invention, I have hereunto set my hand, at Philadelphia, on this 9th day of November, 1911.

AUGUSTUS R. LAMPLUGH.

Witnesses:
M. M. HAMILTON,
A. J. MAGUIRE.

Copies of this patent may be obtained for five cents each, by addressing the "Commissioner of Patents, Washington, D. C."